(12) United States Patent
Takamura et al.

(10) Patent No.: US 8,575,268 B2
(45) Date of Patent: Nov. 5, 2013

(54) THERMOPLASTIC RESIN COMPOSITION

(75) Inventors: Masumi Takamura, Aichi-ken (JP); Kazuaki Mima, Aichi-ken (JP)

(73) Assignee: NOF Corporation, Tokyo (JP)

( * ) Notice: Subject to any disclaimer, the term of this patent is extended or adjusted under 35 U.S.C. 154(b) by 177 days.

(21) Appl. No.: 12/674,672

(22) PCT Filed: Aug. 26, 2008

(86) PCT No.: PCT/JP2008/065202
§ 371 (c)(1),
(2), (4) Date: Feb. 22, 2010

(87) PCT Pub. No.: WO2009/028503
PCT Pub. Date: Mar. 5, 2009

(65) Prior Publication Data
US 2011/0213083 A1    Sep. 1, 2011

(30) Foreign Application Priority Data

Aug. 27, 2007 (JP) .................................. 2007-219388
Oct. 17, 2007 (JP) .................................. 2007-270308

(51) Int. Cl.
*C08L 25/06* (2006.01)
*C08L 101/00* (2006.01)
*C08L 51/00* (2006.01)
*C08K 9/04* (2006.01)

(52) U.S. Cl.
USPC .......................................... 525/63; 525/450

(58) Field of Classification Search
USPC .................................... 525/63, 450
See application file for complete search history.

(56) References Cited

U.S. PATENT DOCUMENTS

| 6,476,098 | B1 | 11/2002 | Arakawa et al. | |
| 2003/0008063 | A1 | 1/2003 | Chabrecek et al. | |
| 2005/0043484 | A1 * | 2/2005 | Wang et al. | 525/132 |
| 2006/0293457 | A1 * | 12/2006 | Nadella et al. | 525/192 |
| 2006/0293458 | A1 * | 12/2006 | Chung et al. | 525/192 |

FOREIGN PATENT DOCUMENTS

| EP | 1 054 035 A2 | 11/2000 |
| GB | 1195214 | 6/1970 |
| JP | 60-42437 A | 3/1985 |
| JP | 61-204212 A | 9/1986 |
| JP | 01-170625 A | 7/1989 |
| JP | 6-100313 A | 4/1994 |
| JP | 06-263830 A | 9/1994 |
| JP | 08-048910 A | 2/1996 |
| JP | 2519045 A | 5/1996 |
| JP | 8-325340 A | 12/1996 |
| JP | 2000-327930 A | 11/2000 |
| JP | 2002-284884 A | 10/2002 |
| JP | 3489411 A | 11/2003 |
| JP | 2004-2605 A | 1/2004 |
| JP | 2004-217714 A | 8/2004 |
| JP | 2004-536633 A | 12/2004 |
| JP | 2006-290693 A | 10/2006 |
| JP | 2007-177137 | 7/2007 |
| JP | 2007-204739 | 8/2007 |
| SU | 1105493 | 7/1984 |

OTHER PUBLICATIONS

Zaichenko et al., Journal of Colloid and Interface Science 275 (2204) 204-213.*
Supplemental European Search Report, Application No. EP 08 82 8876, 5 pgs., dated Sep. 22, 2011.

* cited by examiner

*Primary Examiner* — Jeffrey Mullis
(74) *Attorney, Agent, or Firm* — Seager, Tufte & Wickhem LLC

(57) ABSTRACT

Disclosed is a thermoplastic resin composition containing a graft material and an organic peroxide group dispersion medium in which the graft material is dispersed. The graft material is obtained by melt-mixing a metal oxide fine particle having an organic peroxide group on the surface and a thermoplastic resin, and has a structure in which the thermoplastic resin is grafted to the metal oxide fine particle. The organic peroxide group on the surface of the metal oxide fine particle is preferably a peroxymonocarbonate group. The organic peroxide group on the surface of the metal oxide fine particle is preferably obtained by reacting a hydroxy group of a silicon oxide fine particle with an amino-modified silane coupling agent, thereby introducing an amino group to the surface of the silicon oxide fine particle, and then reacting the amino group with a compound having an ethylenically unsaturated group and an organic peroxide group.

14 Claims, No Drawings

THERMOPLASTIC RESIN COMPOSITION

FIELD OF THE INVENTION

The present invention relates to a thermoplastic resin composition which has excellent mechanical properties and heat resistance and is useful as an organic-inorganic nanocomposite material.

BACKGROUND OF THE INVENTION

In recent years, there has been active research conducted on organic-inorganic composite materials, in which inorganic nanoparticles are dispersed in thermoplastic resins to improve physical properties of the thermoplastic resins, such as mechanical strength, heat resistance, coefficient of linear thermal expansion, and inflammability. Because the inorganic nanoparticles are inorganic materials, the inorganic nanoparticles have poor compatibility with the thermoplastic resins, which are organic materials, and are difficult to disperse uniformly in the thermoplastic resins. Also, the inorganic nanoparticles, due to their nano-sized dimensions, have very large cohesion force working between the particles compared to that of the micron-sized particles. Accordingly, it is difficult to disperse the inorganic nanoparticles uniformly in the thermoplastic resins because of their material and dimensions.

As a material which contains inorganic nanoparticles uniformly dispersed in a thermoplastic resin, there are generally known a material obtained by using a dispersion stabilizer agent, a material obtained by modifying the thermoplastic resin, and a material obtained by modifying the surface of the inorganic nanoparticles. As the material obtained by using a dispersion stabilizer agent, a clay composite material has been proposed (see, for example, Patent Document 1), in which a lamellar clay mineral functioning as the inorganic nanoparticles is dispersed in a polyolefin resin by using, as the dispersion stabilizer agent, a polyolefin polymer having a functional group capable of hydrogen-bonding with the lamellar clay mineral. By using the clay composite material, mechanical properties such as contraction percentage can be improved.

As the material obtained by modifying a thermoplastic resin, there has been proposed a light-transmissive resin composition (see, for example, Patent Document 2), wherein acidic groups capable of forming hydrogen-bond with inorganic fine particles are introduced in the light-transmissive thermoplastic resin when dispersing the inorganic nanoparticles in the light-transmissive resin. The light-transmissive resin composition can decrease orientation birefringence while maintaining transparency.

As the material obtained by modifying the surface of the inorganic nanoparticles, there has been proposed a nano-composite transparent resin composition in which a silica composition is dispersed in a polymer material having phenyl groups within the molecule and the surface layer of the silica composition is modified with the phenyl groups when dispersing (see, for example, Patent Document 3). This type of nano-composite transparent resin composition has excellent transparency and can improve rigidity.

In addition, the following graft copolymer-containing metal oxide fine particles is known (see, for example, Patent Document 4). Namely, this is a material in which a vinyl monomer is graft-polymerized to a composite rubber which comprises the metal oxide fine particles, polyorganosiloxane, and polyalkyl (meth)acrylate. The graft copolymer-containing the metal oxide fine particles has excellent impact strength, surface hardness, and the like, and is used alone or as a mixture with a thermoplastic resin.

Furthermore, as the material obtained by modifying the surface of the inorganic nanoparticles, there has been proposed a polymer composite material (see, for example, Patent Document 4), which is organized with polyfunctional amines capable of forming ionic bonds with a lamellar clay mineral when dispersing the lamellar clay mineral functioning as inorganic nanoparticles in a polyamide resin and, thereafter, is dispersed in the polyamide resin to form hydrogen bonds with the polyamide resin. This type of polymer composite material has excellent mechanical strength and toughness.

Patent Document 1: Japanese Patent No. 3489411 (pages 1 and 2)
Patent Document 2: Japanese Patent Laid-Open No. 2004-217714 (pages 2 and 3)
Patent Document 3: Japanese Patent Laid-Open No. 2004-2605 (pages 2 and 5)
Patent Document 4: Japanese Patent No. 2519045 (pages 1 and 2)
Patent Document 5: Japanese Patent Laid-Open No. H8-325340 (pages 2 and 4)

SUMMARY OF THE INVENTION

However, in the materials described in Patent Documents 1 to 4, the thermoplastic resins and inorganic nanoparticles are not bound or, even if bound, the bond is weak such as hydrogen bond. Thus, dispersibility of the inorganic nanoparticles was poor, making it difficult to obtain sufficient mechanical properties and heat resistance. Further, the graft copolymer-containing metal oxide fine particles described in Patent Document 5, the desired mechanical properties and heat resistance cannot be obtained because a composite rubber-containing polyorganosiloxane is used therein. Additionally, this graft copolymer-containing the metal oxide fine particles was obtained by copolymerizing polyorganosiloxane and polyalkyl(meth)acrylate, with composite rubber-containing metal oxide fine particles therein being formed, and a vinyl monomer is graft-polymerized to the composite rubber. Therefore, the metal oxide fine particles are not bound to other components and, even when an attempt was made to disperse the graft copolymer-containing metal oxide fine particles in a thermoplastic resin, it does not disperse sufficiently. Thus, there has been a problem that it is difficult to improve mechanical properties and heat resistance of the thermoplastic resin by addition of graft copolymer-containing metal oxide fine particles.

An object of the present invention is to provide a thermoplastic resin composition in which metal oxide fine particles are dispersed well and from which molded articles having improved mechanical properties and heat resistance can be produced.

A thermoplastic resin composition according to a first aspect includes a graft material and a thermoplastic resin base material for dispersing the graft material therein. The graft material includes metal oxide fine particles having an organic peroxide group on the surface thereof and a thermoplastic resin which are melt-kneaded. The thermoplastic resin is grafted to the metal oxide fine particles. The graft material has a structure in which the thermoplastic resin and the metal oxide fine particles are bound via a covalent bond, which has relatively high bond strength. Therefore, metal oxide fine particles can be dispersed well in the thermoplastic resin base material more easily compared to the thermoplastic resin composition comprising metal oxide fine particles to which a thermoplastic resin is not grafted, and can improve mechanical properties and heat resistance of the molded articles obtained. The thermoplastic resin base material (also referred to as a matrix) may be a thermoplastic resin of the same kind as or different kind from the thermoplastic resin used when melt-kneading. A portion of the thermoplastic resin used when melt-kneading (for example, a portion of the thermoplastic resin left without being grafted) may also function as the thermoplastic resin base material.

In a thermoplastic resin composition according to a second aspect, the organic peroxide group is a peroxy monocarbonate group. Accordingly, a thermoplastic resin can be graft-reacted efficiently to the metal oxide fine particles.

In a thermoplastic resin composition according to a third aspect, the metal oxide fine particles are formed by using silicon oxide fine particles having hydroxyl groups on the surface thereof. Accordingly, the organic peroxide group can be introduced easily on the surface of the metal oxide fine particles by means of the hydroxyl groups of the silicon oxide fine particles.

In a thermoplastic resin composition according to a fourth aspect, the metal oxide fine particles are organic peroxide group-modified metal oxide fine particles obtained by introducing amino groups on the surface of silicon oxide fine particles by reacting an amino-modified silane coupling agent with the hydroxyl groups of the silicon oxide fine particles and reacting the amino groups and a compound having an ethylenically unsaturated group and an organic peroxide group. Consequently, introduction efficiency of the organic peroxide group can be improved.

In a thermoplastic resin composition according to a fifth aspect, as a physical property of a molded article obtained by molding the thermoplastic resin composition, the bending storage modulus at 30° C. prescribed in JIS K 7244-3 is 1.2 to 5 times as large as the bending storage modulus of the thermoplastic resin alone, and the bending storage modulus at the glass transition temperature is 2 to 10 times as large as the bending storage modulus at the glass transition temperature of the thermoplastic resin alone. Therefore, mechanical properties and heat resistance of the molded article can be improved.

DETAILED DESCRIPTION OF THE PREFERRED EMBODIMENTS

The first embodiment of the present invention will be described below in detail.

The thermoplastic resin composition according to the first embodiment comprises a graft material and a thermoplastic resin base material in which the graft material is dispersed. The graft material is obtained by melt-kneading metal oxide fine particles having an organic peroxide group on the surface (may also be referred to as an organic peroxide group-modified metal oxide fine particles) and a thermoplastic resin, wherein the thermoplastic resin is grafted on the metal oxide fine particles. That is, the thermoplastic resin composition is a mixture containing the graft material and the thermoplastic resin base material.

In the present description, the thermoplastic resin is defined as a resin that is difficult to be deformed at normal temperature but has a property that it becomes soft and easy to be molded upon heating, and becomes hard again upon cooling. For example, the thermoplastic resin may be polystyrene resins, poly(meth)acrylic resins, polycarbonate resins, polyester resins, polyolefin resins, polyamide resins, polyacetal resins, polysulfide resins, polyether resins, or arbitrary mixtures thereof.

The polystyrene resins include polymers such as polystyrene (PS), styrene-methacrylic acid copolymer, styrene-maleic anhydride copolymer, styrene-acrylonitrile copolymer (AS resin), styrene-butadiene copolymer (SBR), acrylonitrile-butadiene-styrene copolymer (ABS resin), methacrylate ester-butadiene-styrene copolymer (MBS resin), high-impact polystyrene (HIPS), styrene-butadiene-styrene block copolymer (SBS), and hydrogenated products thereof, and mixtures of these.

The (meth)acrylic resins include homopolymers of (meth)acrylates such as poly(methyl methacrylate) resin (MMA), poly(ethyl methacrylate) resin, and poly(cyclohexyl methacrylate) resin; copolymers of (meth)acrylates; and mixtures thereof. Here, (meth)acrylic is a collective term which includes both acryl and methacryl.

The polycarbonate resins include bisphenol-A type polycarbonate resin, bisphenol-Z type polycarbonate resin, bisphenol-AF type polycarbonate resin, and the like. The polyester resins include aromatic polyester resins such as polyethylene terephthalate (PET) resin, polybutylene terephthalate (PBT) resin, and polyethylene naphthalate (PEN) resin; aliphatic polyester resins such as poly-L-lactic acid (PLLA) resin, poly-ε-caprolactam (PCL) resin, and polybutylene succinate (PBS) resin; and mixtures of these.

The polyolefin resins include homopolymers such as low-density polyethylene (LDPE) resin, high-density polyethylene (HDPE) resin, linear low-density polyethylene (LLDPE) resin, polypropylene (PP) resin, polybutene (PB) resin, and cyclic polyolefin (COP) resin; the corresponding copolymers; and mixtures thereof.

The polyamide resins include nylon 6 (PA6) resin, nylon 66 (PA66) resin, nylon 12 (PA12) resin, and the like. The polyacetal resins include homopolymers such as polyoxymethylene (POM) resin and polyoxyethylene (POE) resin; the corresponding copolymers; and mixtures thereof. The polysulfide resins may be polyphenylene sulfide (PPS) resin and the like. The polyether resins include polyether ether ketone (PEEK) resin and the like.

Among the above-mentioned thermoplastic resins, preferable from a viewpoint of high transparency of the molded article are amorphous thermoplastic resins such as polystyrene resins, poly(meth)acrylic resins, polycarbonate resins, and cycloaliphatic polyolefin resins. Above all, polystyrene resins are more preferable.

The mass average molecular weight (Mw) of the thermoplastic resin, in terms of polystyrene reduced value according to a gel permeation chromatography (GPC) analysis, is preferably 10,000 to 1,000,000, more preferably, 50,000 to 500,000. If the mass average molecular weight is less than 50,000, mechanical properties practically required of molded articles and the like of the thermoplastic resin composition become difficult to obtain. On the other hand, if the mass average molecular weight exceeds 500,000, moldability of the thermoplastic resin composition tends to become worse. In addition, the polydispersity index (Mw/Mn) of the thermoplastic resin, calculated from the mass average molecular weight (Mw) and number average molecular weight (Mn), is preferably 1.1 to 50, more preferably 1.2 to 10. When this polydispersity index is either less than 1.1 or more than 50, the moldability of the thermoplastic resin composition tends to become worse.

In the present description, the metal oxide fine particles are defined as ones which comprise metal oxides and have a particle size (particle diameter) of nanometer (nm) level. The metal oxide fine particles are not particularly limited and include fine particles of, silicon oxide (silica, $SiO_2$) [glass fiber, glass beads, silica-based balloons], calcium silicate (wollastonite and xonotlite), talc, clay, mica, montmorillonite, bentonite, activated white earth, sepiolite, imogolite, sericite, titanium(II) oxide, titanium(III) oxide, titanium(IV) oxide, aluminum oxide, iron(II) oxide, iron(III) oxide, copper (I) oxide, copper(II) oxide, magnesium oxide, calcium oxide, zirconium dioxide, chromium(II) oxide, chromium(III) oxide, chromium(IV) oxide, antimony(III) oxide, antimony (V) oxide, yttrium(III) oxide, indium(I) oxide, indium(II) oxide, indium(III) oxide, potassium oxide, silver(I) oxide, silver(II) oxide, germanium(II) oxide, germanium(IV) oxide, cobalt(II) oxide, cobalt(III) oxide, tin(II) oxide, tin(IV) oxide, cesium oxide, thallium (I) oxide, thallium(III) oxide, tungsten(IV) oxide, tungsten(VI) oxide, zinc oxide, barium oxide, manganese(II) oxide, manganese(III) oxide, manganese(IV) oxide, manganese(VI) oxide, molybdenum(IV) oxide, molybdenum(VI) oxide, lithium oxide, ruthenium(VII) oxide, ruthenium(VIII) oxide, and the like. These metal oxide fine particles may be used alone or in a combination of two or more kinds.

In general, there is atmospheric moisture adsorbed on the surface of metal oxides and, depending on the kind of metal atom in the metal oxide, the metal oxide has hydroxyl groups on the surface. This hydroxyl groups on the surface are utilized when the surface of the metal oxide is organically modified. Thus, as the metal oxide, more preferable are silicon oxide, titanium oxide, aluminum oxide, and iron oxide, which tend to possess hydroxyl groups on the surface, the hydroxyl groups being able to react with organic functional groups. Silicon oxide is most preferable because there are known many methods to modify the metal oxide fine particles with organic peroxide groups.

The shape of the metal oxide fine particles is not particularly limited. It may not only be the usual spherical one but also be polyhedral, planar, linear like a fiber, branch-shaped, and the like. There may also be used metal oxide fine particles having smooth surface, hollow metal oxide fine particles having cavity (fine pores or voids) inside, and porous metal oxide fine particles. The method for producing metal oxide fine particles is not particularly limited and there may be employed an arbitrary method such as a gas-phase method, a sol-gel method, a colloid precipitation method, a molten metal spray-oxidation process, and an arc discharge method.

The number average particle size of the primary metal oxide fine particles is not particularly limited but a range of 1 to 1000 nm is preferable because, in that range, effects are exhibited with a small content thereof. Also, the number average particle size in a range of 1 to 200 nm is more preferable because, in that range, transparency of the thermoplastic resin composition is improved and a small content can improve heat resistance. The above-mentioned number average particle size of the primary metal oxide fine particles is measured from particle images obtained by observation of the metal oxide fine particles by a transmission electron microscope (TEM). Here, the metal oxide fine particles were dispersed in an arbitrary solvent in which the metal oxide fine particles could be dispersed and the resulting dispersion was dripped on a collodion film. The number average particle size of the primary metal oxide fine particles refers to a number average particle size calculated by measuring the particle sizes of at least 100 particles by a ruler and number-averaging the sizes. However, when the particle image obtained by TEM observation is not circular, the area the particles occupy is calculated and the particle is replaced with a circle having the same area. The diameter of this circle is termed the particle size.

The thermoplastic resin composition is characterized in that the metal oxide fine particles are uniformly dispersed in the thermoplastic resin base material and the number average particle size of dispersion is small. The number average particle size of dispersion of the metal oxide fine particles in the thermoplastic resin composition is typically 1 to 1000 nm, preferably 1 to 200 nm. These values are nearly the same as the aforementioned number average particle size of the primary metal oxide fine particles. Namely, this shows that even after the metal oxide fine particles became incorporated in the thermoplastic resin composition, the particles are dispersed uniformly in the thermoplastic resin composition maintaining a state close to the number average particle size of the primary metal oxide fine particles without little agglomeration between the particles.

As described above, the number average particle size of dispersion of the metal oxide fine particles in a range of 1 to 1000 rim is preferable because effects are exhibited even when using a small content of the particles. In addition, the number average particle size in a range of 1 to 200 nm is more preferable because transparency of the thermoplastic resin composition is improved and heat resistance is improved even when using a small content of the particles. From a standpoint of better dispersion, the preferable range of the number average particle size of dispersion of the metal oxide fine particles in the thermoplastic resin composition is the same range as the number average particle size of the primary metal oxide fine particles.

The organic peroxide group bound to the surface of the metal oxide fine particles (which group may also be referred to as a pendant peroxide group) is not particularly limited as long as it contains a peroxide bond within the molecule. Specific examples of the organic peroxide group may include hydroperoxide group (—OOH), alkyl peroxide group (—OOR$^1$ wherein R$^1$ is represented by $C_nH_{2n+1}$ or $C_6H_4$—$C_{m-1}H_{2m-1}$; n and m are integers from 1 to 20), diacyl peroxide group (—C(O)OO(O)CR$^2$ wherein R$^2$ is represented by $C_nH_{2n+1}$; n is an integer from 1 to 20), peroxy ester group (—C(O)OOR$^3$ wherein R$^3$ is represented by $C_nH_{2n+1}$ or $C_6H_4$—$C_{m-1}H_{2m-1}$; n and m are integers from 1 to 20), peroxy monocarbonate group (—OC(O)OOR$^3$ wherein R$^3$ is or $C_nH_{2n+1}$ or $C_6H_4$—$C_{m-1}H_{2m-1}$; n and m are integers from 1 to 20), and peroxy ketal group (—$C_xH_{2x-1}(OOR^4)_2$) wherein R$^4$ is represented by $C_nH_{2n+1}$ or $C_6H_4$—$C_{m-1}H_{2m-1}$; x, n, and m are integers from 1 to 20). Above all, the peroxy monocarbonate group is more preferable from a standpoint of grafting (coupling) efficiency of a radical to polystyrene, the cleaved radical on the surface of the metal oxide fine particles.

The method for introducing an organic peroxide group to the surface of the metal oxide fine particles is not particularly limited and publicly known methods can be employed. Examples of the method may include two specific methods; a method to modify the hydroxyl groups on the surface of the metal oxide fine particles directly with functional groups and thereby to introduce the organic peroxide group; and a method to modify the hydroxyl groups on the surface of the metal oxide fine particles with a functional group-modified silane coupling agent and thus to introduce the organic peroxide group. From a standpoint of efficiency of introducing the organic peroxide group, the latter method is preferable.

The method for introducing organic peroxide group by directly modifying with functional groups includes an introducing method of a hydroperoxide group by oxidation of the hydroxyl group (—OH) on the surface of the metal oxide fine particles, an introducing method of a dialkyl peroxide group by similarly chlorinating the hydroxyl group with thionyl chloride and further reacting with hydroperoxide, an introducing method of a peroxy ester group by reacting a polyfunctional acid chloride with the hydroxyl group leaving a part of the acid chloride and further reacting with hydroperoxide, an introducing method of a diacyl peroxide group by reacting a polyfunctional acid chloride with the hydroxyl group leaving a part of the acid chloride and further reacting with a monofunctional aliphatic acid chloride or a monofunctional aromatic acid chloride under presence of acid, an introducing method of a peroxy monocarbonate group by reacting a polyfunctional chloroformate or a compound containing an acid chloride and chloroformate within one molecule with the hydroxyl group leaving a part of chloroformate and further reacting with hydroperoxide, an introducing method of a peroxy ketal group by reacting an acid chloride having a ketone with the hydroxyl group, followed by reaction of the ketone and hydroperoxide, and the like.

The method for introducing organic peroxide group by modifying the hydroxyl groups on the surface of the metal oxide fine particles with a functional group-modified silane coupling agent includes an introducing method of an organic peroxide group by reacting an organic peroxide group-containing silane coupling agent with the hydroxyl group on the metal oxide fine particles, an introducing method of a dialkyl peroxide group by similarly reacting a chloro group-containing silane coupling agent with a hydroxyl group, followed by further reaction with hydroperoxide, an introducing method of an organic peroxide group by reacting an amino-modified silane coupling agent with the hydroxyl group and followed by Michael-adding a compound having an ethylenically unsaturated group and an organic peroxide group within one molecule, and the like. Above all, preferable from a standpoint of reactivity and simplicity is the introducing method of an organic peroxide group by reacting (dealcoholization reaction) an amino-modified silane coupling agent with the hydroxyl groups on the surface of the metal oxide fine particles, followed by a Michael addition reaction of a compound having an ethylenically unsaturated group and an organic peroxide group within one molecule.

As a specific introducing method, the following process may be mentioned. Namely, first, the hydroxyl groups on the surface of the metal oxide fine particles are subjected to a dealcoholization reaction with an amino-modified silane coupling agent (for example, γ-aminopropyltriethoxysilane) to obtain metal oxide fine particles (may also be referred to as amino group-modified metal oxide fine particles) having amino groups (—$NH_2$). Subsequently, to the amino groups on the surface of the metal oxide fine particles, t-butylperoxy-2-methacryloyloxyethyl carbonate, a compound having an ethylenically unsaturated group and an organic peroxide group, is Michael-added to introduce t-butylperoxy monocarbonate groups on the surface of the metal oxide fine particles. In this case, the content of the amino groups on the surface of the metal oxide fine particles is preferably 0.1 to 5 mass parts per 100 mass parts of the metal oxide fine particles, more preferably 0.1 to 2 mass parts. When the content of the amino groups is less than 0.1 mass part, the amount of the organic peroxide group introduced in the next step becomes less and, when the content exceeds 5 mass parts, introduction of the organic peroxide group tends to be excessive.

The content of the organic peroxide group on the surface of the metal oxide fine particles is usually preferably 0.1 to 10 mass parts, more preferably 0.3 to 9 mass parts per 100 mass parts of the metal oxide fine particles. When the content of the peroxide groups is less than 0.1 mass part, dispersibility of the metal oxide fine particles in the thermoplastic resin composition tends to become worse and, when the contents exceeds 10 mass parts, moldability of the thermoplastic resin composition tends to become worse.

The metal oxide fine particles having a thermoplastic resin grafted thereto, which are contained in the thermoplastic resin composition, can be obtained by a simple method of melt-kneading the metal oxide fine particles having an organic peroxide group on the surface thereof and a thermoplastic resin. As a mechanism how the metal oxide fine particles having a thermoplastic resin grafted thereto is obtained, the following can be presumed. First, the organic peroxide group on the surface of the metal oxide fine particle cleaves by melt-kneading and generate radicals which bind to the surface of the metal oxide fine particles and radicals which do not bind to the surface of the metal oxide fine particles. The radicals, which do not bind to the surface of the metal oxide fine particles, abstract hydrogen atoms in the thermoplastic resin molecule and generate thermoplastic resin radicals. Thereafter, by rebonding of the radicals bound on the surface of the metal oxide fine particles and the thermoplastic resin radicals, it is thought that there are generated the metal oxide fine particles having a thermoplastic resin grafted thereto. In this case, it is thought that the rebonding of radicals becomes easier when the organic peroxide group is a peroxy monocarbonate group.

The temperature for melt-kneading to produce a thermoplastic resin composition containing metal oxide fine particles having a thermoplastic resin grafted thereto is not particularly limited as long as the temperature is one where the thermoplastic resin melts and the organic peroxide group decomposes, but is generally preferably 170° C. to 280° C. Also, the time of melt kneading is not particularly limited as long as it is a time during which the organic peroxide group sufficiently decomposes and grafting reactions with a thermoplastic resin are possible. However, the time is generally preferably 30 minutes or less, more preferably 10 minutes or less.

Production of a thermoplastic resin composition containing metal oxide fine particles having a thermoplastic resin grafted thereto is carried out by a conventional method and is not particularly limited. For example, there may be mentioned a method whereby a thermoplastic resin and metal oxide fine particles having an organic peroxide group are dry-blended and, thereafter, the mixture is charged into a melt-kneading machine; and a method whereby a dispersion of metal oxide fine particles, having the organic peroxide, in a solvent is injected in the middle of melt-blending of a thermoplastic resin by a melt-kneading machine and, in the later stage of melt-kneading, the solvent is removed under vacuum from the melt thermoplastic resin composition. As the melt-kneading machine, there may be mentioned publicly known extruders such as a uniaxial extruder and a biaxial extruder; and melt-kneading machines such as a banbury mixer, a Brabender, a plastograph, a thermal roll, and a kneader.

As a method to investigate the presence of metal oxide fine particles having a thermoplastic resin grafted thereto, publicly known methods can be employed. For example, a method may be mentioned, whereby a thermoplastic resin which is not grafted to the metal oxide fine particles and a thermoplastic resin which is grafted to the metal oxide fine particles are separated by using the fact that the metal oxide particles have higher specific gravity than the thermoplastic resin, followed by confirmation by analyzing the thermoplastic resin grafted to the metal oxide fine particles qualitatively and quantitatively by thermogravimetry (TG) and a Fourier transform infrared spectrophotometer (FT-IR). As a specific method of separating the metal oxide fine particles having a thermoplastic resin grafted thereto, there may be mentioned a method whereby a dispersion of the thermoplastic resin composition dispersed in a good solvent for the thermoplastic resin is centrifuged and a resulting precipitate is taken out. In addition, a specific measurement of the amount of the thermoplastic resin, introduced in the metal oxide fine particles having a thermoplastic resin grafted thereto, involves the following method. The precipitate is subjected to thermogravimetry, and from the decomposed amount of the organic component in the metal oxide fine particles having the thermoplastic resin grafted thereto, the amount introduced is calculated. To judge whether or not the grafted component is a thermoplastic resin, the precipitate is measured by FT-IR, and presence or absence of a peak characteristic of the thermoplastic resin is confirmed. Here, a ratio of absorption intensity of a peak characteristic of the metal oxide as a denominator and absorption intensity of the peak characteristic of the thermoplastic resin as a numerator can be regarded as a measure of a relative quantity of the thermoplastic resin component.

The introduced amount of thermoplastic resin introduced in the metal oxide fine particles having the thermoplastic resin grafted thereto is preferably 1 to 40 mass parts relative to 100 mass parts of the metal oxide fine particles. When this amount introduced is less than 1 mass part, the graft ratio is so low that the mechanical properties and heat resistance of a molded article obtained from the thermoplastic resin composition cannot be improved sufficiently. On the other hand, when the amount introduced is more than 40 mass parts, there is a need to improve grafting efficiency and production of the graft material becomes difficult.

Furthermore, the content of the graft material in the thermoplastic resin composition is preferably 0.01 to 50 mass parts relative to 100 mass parts of the thermoplastic resin composition. The content of the graft material less than 0.01 mass part may lower heat resistance of the molded article obtained from the thermoplastic resin composition and is not preferable. On the other hand, the content more than 50 mass parts may worsen moldability of the thermoplastic resin composition and is not preferable.

In order to dilute or to improve mechanical properties of the molded article, if necessary, there may be mixed to the thermoplastic resin composition a thermoplastic resin of the same kind as or a different kind from the thermoplastic resin which is grafted to the surface of the metal oxide fine particles. Further, if necessary, there may be added to the thermoplastic resin composition an ultraviolet protective agent, an antioxidant, a hydrolysis protective agent, an antistatic agent, a flame retardant, fillers, pigments, a coloring agent, a release agent, a lubricant, a foaming agent, a crystal nucleating agent, antibacterial and antifungal agent, and the like in an amount that does not impair the characteristics of the thermoplastic resin composition.

By molding the above-mentioned thermoplastic resin composition into a given form, a desired molded article is obtained. As the molding method of the thermoplastic resin composition, a molding method using a generally employed molding machine for thermoplastic resins is sufficient. Specifically, the molding method may be a calendar molding method, a foam molding method, an extrusion molding method, an injection molding method, a vacuum molding method, a blow molding method, and the like.

The molded articles include extrusion-molded articles, thermoformed articles, blow-molded articles, foam-molded articles, injection molded articles, and the like such as sheets, films, and tubes. These molded articles can be used as a layered material laminated with other thermoplastic resins; multi-layered molded films which are gravure printed with paints; painted articles coated with a primer, a paint base, and a hard-coat coating liquid; and the like. Applications of these molded articles include, for example, optical materials such as an optical lens, a diffusion film, and a light guide plate; optical discs; cover films for optical discs; lamps for vehicles; and organic glass.

These molded articles are obtained from the thermoplastic resin composition containing a graft material having a thermoplastic resin grafted to metal oxide fine particles and, thus, have excellent mechanical properties such as a bending storage modulus, and heat resistance.

With regard to the bending storage modulus, an excellent mechanical property means that the bending storage modulus at 30° C. (hereinafter, may also be referred to as $E'_{30° C.}$) prescribed in JIS K 7244-3 and obtained by use of a dynamic viscoelasticity measuring instrument is 1.2 to 5 times as large as $E'_{30° C.}$ of the thermoplastic resin alone. With $E'_{30° C.}$ in this range, molded articles having higher mechanical properties than the thermoplastic resin alone can be obtained.

Also, the characteristic that heat resistance is excellent means that the mechanical properties at high temperature are excellent and refers to the storage modulus ($E'_{TG}$) at the glass transition temperature ($T_g$) which is 2 to 10 times as large as $E'_{TG}$ at $T_g$ of the thermoplastic resin alone. With $E'_{TG}$ in this range, molded articles having higher heat resistance at a high temperature than the thermoplastic resin alone can be obtained.

In the first embodiment, the following effects and advantages are obtained.

The thermoplastic resin composition according to the first embodiment contains a graft material which comprises metal oxide fine particles having an organic peroxide group on the surface and a thermoplastic resin melt-kneaded, wherein the thermoplastic resin is grafted to the metal oxide fine particles. This type of graft material has a structure in which the thermoplastic resin and the metal oxide fine particles are bound via a covalent bond, which has relatively high bond strength. Therefore, the metal oxide fine particles has better dispersibility in the thermoplastic resin composition compared to the thermoplastic resin composition containing metal oxide fine particles having no thermoplastic resin grafted thereto, and can improve mechanical properties and heat resistance of the molded articles obtained. Accordingly, the thermoplastic resin composition is very useful as an organic-inorganic composite material comprising a thermoplastic resin as the organic material and metal oxide fine particles as the inorganic nanoparticles.

By the organic peroxide group on the surface of the metal oxide fine particles being a peroxy monocarbonate group, rebinding of radicals is accelerated and the graft reaction of thermoplastic resin to the metal oxide fine particles can be carried out efficiently.

By the organic peroxide group on the surface of the metal oxide fine particles being formed by using silicon oxide fine particles having a hydroxyl group on the surface, the organic peroxide group can be introduced easily on the surface of the metal oxide fine particles by using the hydroxyl groups of the silicon oxide fine particles.

The organic peroxide group on the surface of the metal oxide fine particles is obtained by introducing amino groups on the surface of silicon oxide fine particles by reacting an amino-modified silane coupling agent with the hydroxyl groups on the silicon oxide fine particles, followed by reacting a compound having an ethylenically unsaturated group and an organic peroxide group with the amino group. In this case, each reaction proceeds quantitatively and the efficiency of introduction of the organic peroxide group can be improved.

As physical properties of the molded article obtained by molding the thermoplastic resin composition, the bending storage modulus at 30° C., prescribed in JIS K 7244-3, is 1.2 to 5 times as large as the bending storage modulus of the thermoplastic resin alone. Also, the bending storage modulus at the glass transition temperature is 2 to 10 times as large as the bending storage modulus at the glass transition temperature of the thermoplastic resin alone. In this case, the mechanical properties and heat resistance of the molded articles can be improved.

Hereinafter, the second embodiment of the present invention will be described with emphasis on the difference thereof from the first embodiment.

In the second embodiment, a crystalline thermoplastic resin is used as the thermoplastic resin in the first embodiment. In the present description, the crystalline thermoplastic resin is defined as a resin which has a property that, even though it is difficult to deform at normal temperature, it becomes soft and easy to mold upon heating and becomes hard again upon cooling, and which can form macromolecular crystals. As such crystalline thermoplastic resins, preferable are those which show, in the measurement of heat of crystallization prescribed in JIS K 7122, exothermic heat of crystallization when cooled at a cooling rate of 2° C./min. Such crystalline thermoplastic resins specifically include crystalline polystyrene resins, crystalline polyester resins, crystalline polyolefin resins, crystalline polyamide resins, crystalline polyacetal resins, polysulfide resins, polyether resins, and arbitrary mixtures thereof.

The crystalline polystyrene resins include isotactic polystyrene (iPS) resin and syndiotactic polystyrene (sPS) resin. As the crystalline polyester resins, crystalline polyolefin resins, crystalline polyamide resins, crystalline polyacetal resins, polysulfide resins, polyether resins, there may be mentioned, among the compounds detailed in the first embodiment, those compounds which satisfy the definition of the crystalline thermoplastic resin.

Among the crystalline thermoplastic resins, from a point of view that the levels of improvements in the rate of crystallization and the degree of crystallization, preferable areisotactic polystyrene (iPS) resin, syndiotactic polystyrene (sPS) resin, polyethylene terephthalate (PET) resin, polybutylene terephthalate (PET) resin, polyethylene naphthalate (PEN) resin, poly-L-lactic acid (PLLA) resin, low-density polyethylene (LDPE) resin, high-density polyethylene (HDPE) resin, linear low-density polyethylene (LLDPE) resin, polypropylene (PP) resin, polybutene (PB) resin, nylon 6 (PA6) resin, and polyoxymethylene (POM) resin.

The mass average molecular weight (Mw) of the crystalline thermoplastic resin, in terms of polystyrene reduced value according to a gel permeation chromatography (GPC) analysis, is preferably 10,000 to 1,000,000, more preferably, 50,000 to 500,000. When the mass average molecular weight is less than 10,000, mechanical properties practically required of molded articles and the like of the crystalline thermoplastic resin composition become difficult to obtain. On the other hand, when the mass average molecular weight exceeds 1,000,000, moldability of the crystalline thermoplastic resin composition tends to become worse. In addition, the preferable polydispersity index (Mw/Mn) of the crystalline thermoplastic resin is the same as the polydispersity index of the thermoplastic resin described in the first embodiment.

The details of the metal oxide fine particles in the second embodiment are referred to the explanation provided in the first embodiment except the following points.

When the thermoplastic resin is a crystalline thermoplastic resin, the particle size of the metal oxide fine particles is defined as in a range of nanometer (nm) to micrometer (μm). The number average particle size of the primary metal oxide fine particles is not particularly limited, but the particle size being in a range of 1 to 10,000 nm is preferable in that effects are exhibited with a small content thereof. Also, the particle size being in a range of 1 to 500 nm is more preferable in that a small content thereof can improve heat resistance as a result of improvements in the rate of crystallization and the degree of crystallization.

The number average particle size of dispersion of the metal oxide fine particles in the crystalline thermoplastic resin composition is typically 1 to 10,000 nm, preferably 1 to 500 nm. These values are nearly the same as the number average particle size of the aforementioned primary metal oxide fine particles. Namely, this shows that even after the metal oxide fine particles became incorporated in the crystalline thermoplastic resin composition, the particles are dispersed uniformly in the crystalline thermoplastic resin composition without little agglomeration among the particles and in a state close to the number average particle size of the primary metal oxide fine particles.

It is preferable that the number average particle size of dispersion of the metal oxide fine particles used together with a crystalline thermoplastic resin is in a range of 1 to 10,000 nm because, in that range, a small content thereof exhibits effects. In addition, this number average particle size being in a range of 1 to 500 nm is more preferable in that a small content thereof can improve heat resistance as a result of improvements in the rate of crystallization and the degree of crystallization. From a standpoint of better dispersibility, in the crystalline thermoplastic resin composition, the preferable range of number average particle size of dispersion of the metal oxide fine particles is the same range as the number average particle size of the primary metal oxide fine particles.

Organic peroxide group can be introduced on the surface of the metal oxide fine particles of the second embodiment according to the method described in the first embodiment. However, in the second embodiment, the content of the amino groups on the surface of the metal oxide fine particles is preferably 0.1 to 1 mass part, more preferably 0.5 to 0.8 mass part per 100 mass parts of the metal oxide fine particles. When the content of the amino groups is less than 0.1 mass part, the amount of the organic peroxide group introduced in the next step becomes less and when the content exceeds 1 mass part, the amount of the organic peroxide group introduced tends to become excessive.

In the second embodiment, the content of the graft material in the crystalline thermoplastic resin composition is preferably 0.5 to 20 mass parts relative to 100 mass parts of the crystalline thermoplastic resin composition. The content of less than 0.5 mass part results in lowering of heat resistance of the molded article obtained from the crystalline thermoplastic resin composition and is not preferable. On the other hand, the content of more than 20 mass parts results in worsening of moldability of the crystalline thermoplastic resin composition and is not preferable.

In a molded article obtained from the crystalline thermoplastic resin composition which contains a graft material comprising metal oxide fine particles having a crystalline thermoplastic resin grafted thereto, dispersibility of the metal oxide fine particles is improved, the rate of crystallization of the crystalline thermoplastic resin becomes faster, and the degree of crystallization becomes higher. As a result, the mechanical properties and heat resistance of the molded articles are improved. The reason why these effects are obtained is presumed to be as follows. Namely, the metal oxide fine particles function as a crystal nucleating agent for the crystalline thermoplastic resin and facilitate crystallization of the crystalline thermoplastic resin. In addition, in the graft material wherein the crystalline thermoplastic resin is grafted to the metal oxide fine particles, the crystalline thermoplastic resin and the metal oxide fine particles are bound through covalent bonds and, therefore, the surface area of the metal oxide fine particles, the crystal nucleating agent, and their function as a crystal nucleating agent increase, further facilitating crystallization of the crystalline thermoplastic resin. Furthermore, the stronger the mutual interaction with the crystalline thermoplastic resin is, the better the crystal nucleating agent exhibits its function as a crystal nucleating agent. Thus, because the crystalline thermoplastic resin is grafted to the metal oxide fine particles, the graft material is presumed to contribute to improvement of the rate of crystallization and the degree of crystallization.

Here, the rate of crystallization being fast is defined that the crystallization peak temperature is close to the equilibrium melting point of the crystalline thermoplastic resin, the crystallization peak temperature being obtained by the method prescribed in JIS K 7121 whereby the crystalline thermoplastic resin is kept for 10 minutes at a temperature 30° C. higher than the temperature at the end of the melting peak and, thereafter, cooled at a speed of 10° C./minute. Namely, this shows that the degree of supercooling, as represented by the difference between the equilibrium melting point of the crystalline thermoplastic resin and the crystallization peak temperature obtained above, is small. This degree of supercooling is preferably 0 to 120° C. In a resin with a fast rate of crystallization, the degree of supercooling is close to 0° C. and in the resin such as poly-L-lactic acid with slow rate of crystallization, the degree of supercooling is close to 120° C.

The degree of crystallization being high is defined that the heat of crystallization prescribed in JIS K 7122 is close to the heat of melting of a crystalline thermoplastic resin which has a degree of crystallization of 100%. That is, when the ratio of the above heat of crystallization to the heat of melting of the crystalline thermoplastic resin is high, the degree of crystallization is said to be high. The degree of crystallization is preferably 20 to 100%. The degree of crystallization becomes close to 100% in case of a resin with fast rate of crystallization, but in a case of a resin with slow rate of crystallization such as in poly-L-lactic acid, the value becomes close to 20%. As has been described, when the degree of supercooling is 0 to 120° C. and the degree of crystallization is 20 to 100%, there can be obtained a molded article having higher mechanical properties and heat resistance than the crystalline thermoplastic resin. This is because the mechanical properties and heat resistance of the molded article is based on the fast rate of crystallization and high degree of crystallization of the crystalline thermoplastic resin and is proportional to the degree of crystallization.

In the second embodiment, the following effects and advantages are obtained.

The crystalline thermoplastic resin composition according to the second embodiment can easily be obtained by melt-kneading metal oxide fine particles having organic peroxide group on the surface and a crystalline thermoplastic resin. In this crystalline thermoplastic resin composition, there is contained a graft material wherein the crystalline thermoplastic resin is grafted to the metal oxide fine particles, the graft material comprising the thermoplastic resin and the metal oxide fine particles which are bound via covalent bonds of high bond strength. Therefore, compared to the crystalline thermoplastic resin composition which contains metal oxide fine particles having no crystalline thermoplastic resin grafted thereto, dispersibility of the metal oxide fine particles is improved and, thus, the rate of crystallization of the crystalline thermoplastic resin can be made faster and, moreover, the degree of crystallization can be improved. As a result, the mechanical properties and heat resistance of the molded articles obtained from the crystalline thermoplastic resin composition is thought to be improved.

In the crystalline thermoplastic resin composition, it is preferable that the degree of supercooling obtained from the crystallization peak temperature as prescribed in JIS K 7121 is 0 to 120° C. and the degree of crystallization obtained from heat of crystallization as prescribed in JIS K 7122 is 20 to 100%. In this case, the rate of crystallization of the crystalline thermoplastic resin can be made faster and the degree of crystallization of the crystalline thermoplastic resin can be improved, thus contributing to improvements in the mechanical properties and heat resistance of a molded article obtained from the crystalline thermoplastic resin composition.

By the crystalline thermoplastic resin being one wherein, when cooled at a cooling rate of 2° C./min in the measurement of the heat of crystallization as prescribed in JIS K 7122, exothermic heat of crystallization is observed, the crystalline thermoplastic resin exhibits sufficient crystallizability.

By the organic peroxide group on the surface of the metal oxide fine particles being a peroxy monocarbonate group, the thermoplastic resin can be efficiently grafted to the metal oxide fine particles.

By the organic peroxide group on the surface of the metal oxide fine particles being formed by using silicon oxide fine particles having hydroxyl group on the surface, the organic peroxide group can be introduced easily on the surface of the metal oxide fine particles using the hydroxyl groups of the silicon oxide fine particles.

Hereinafter, examples of the first embodiment will be described. The scope of the present invention is not limited to the examples.

First, methods of measurement of the values of various physical properties are described.

(1) Number Average Molecular Weight (Mn), Mass Average Molecular Weight (Mw), and Polydispersity Index (Mw/Mn)

Using a gel permeation chromatography instrument (GPC, produced by Shimadzu Corporation) equipped with a differential refractive index detector, molecular weights in terms of standard polystyrene were obtained with tetrahydrofuran (THF) as an eluent and the column temperature set at 40° C.

(2) Qualitative and Quantitative Analysis of Thermoplastic Resin in Metal Oxide Fine Particles Having Thermoplastic Resin Grafted Thereto in Thermoplastic Resin Composition In 100 ml of tetrahydrofuran (THF), 1 g of a thermoplastic resin composition was dissolved. In the case of a crystalline thermoplastic resin composition, chloroform was used instead of THF. The obtained solution was centrifuged at a high speed (20,000 rpm) for 20 minutes by a centrifuge machine (produced by Kubota Corporation, 7780). The precipitate obtained was further washed with a 100 ml of THF and centrifuged at a high speed for 20 minutes. This operation of washing and centrifuge was repeated three times in total and the obtained precipitate was dried under vacuum at room temperature for 2 hours. Thus, the metal oxide fine particles (graft material) having a thermoplastic resin grafted thereto was separated.

This graft material was analyzed qualitatively and quantitatively by a Fourier transform infrared spectrophotometer (produced by JASCO Corporation, FT-IR-610) from a ratio ($I_P/I_M$) of characteristic peak intensity ($I_M$) of the metal oxide and a characteristic peak intensity ($I_P$) of the thermoplastic resin. Also, with the graft material obtained, the decomposed mass % of the organic component in the graft material (ratio of the organic component to the graft material) was measured using a thermogravimetric instrument (produced by SII Nanotechnology Inc., TG 220) under conditions of a temperature range of measurement: 30 to 800° C. and a rate of temperature increase: 10° C./min. From this value, the mass parts of the organic component relative to 100 mass parts of metal oxide fine particles were recalculated and the value was defined as the amount of the thermoplastic resin introduced.

(3) Dispersibility of Metal Oxide Fine Particles in Thermoplastic Resin Composition Measurement of the number of particles per 1 $\mu m^2$ and the number average dispersed particle size of the metal oxide fine particles in the thermoplastic resin composition: from the thermoplastic resin composition obtained, an ultrathin section of 50 to 100 $\mu m$ thickness was prepared by using an ultramicrotome (produced by Leica Microsystems GmbH, UltraCut UCT). Using a transmission electron microscope (TEM) (produced by Nihon Denshi Co., Ltd., JEM-1200EX), the dispersion state of metal oxide fine particles in the ultrathin section obtained was observed and photographed. Using several of the TEM photographs obtained, the number of independent particles which can be observed in the visual field was counted over an area of 100 $\mu m^2$ or larger and the number of countable particles per 1 $\mu m^2$ was calculated. When a crystalline thermoplastic resin was used, the number of countable particles per 9 $\mu m^2$ was calculated. When the kind and amount of the particles added are the same, the presence of particles in an agglomerated state results in decrease in the number of particles per unit area. Thus, by this method, it becomes possible to evaluate dispersibility of the particles. Also, in the TEM photographs, an arbitrary area, where 100 or more dispersed metal oxide fine particles were present, was selected, the particle diameters were measured using a scale ruler, and the number average dispersed particle size was calculated.

(4) Bending Storage Modulus ($E'_{30°C.}$) at 30° C.

Using a dynamic viscoelasticity measuring instrument (produced by SII Nanotechnology Inc., DMS 6100), the bending storage modulus ($E'_{30°C.}$) at 30° C. of a test piece of 20 mm width, 40 mm length, and 1 mm thickness was measured under conditions of a measurement mode: sine-wave mode with the sample held at both ends; the temperature range of measurement, 30 to 220° C.; the rate of temperature increase, 2° C./min.

(5) Bending Storage Modulus ($E'_{TG}$) at Glass Transition Temperature (Tg)

Using a dynamic viscoelasticity measuring instrument (produced by SII Nanotechnology Inc., DMS 6100), the bending storage modulus ($E'_{TG}$) of a test piece of 20 mm width, 40 mm length, and 1 mm thickness at the glass transition temperature (Tg), namely at a temperature where the tan δ becomes maximum, was measured under conditions of a measurement mode: sine-wave mode with the sample held at both ends; the temperature range of measurement, 30 to 220° C.; the rate of temperature increase, 2° C./min.

(6) Degree of Supercooling of Crystalline Thermoplastic Resin Composition

Using a scanning differential calorimeter (DSC, produced by SII Nanotechnology Inc.), 10 mg of a thermoplastic resin composition was placed in a closed cell made of aluminum and heated from room temperature to 220° C. at a rate of 10° C./min and, after being kept at 220° C. for 10 minutes, cooled from 220° C. to room temperature at a rate of 10° C./min. The exothermic peak temperature observed in the crystallization exothermic curve during the temperature-lowering process was defined as the crystallization peak temperature (° C.) and the difference thereof from 215° C., the equilibrium melting point, was calculated.

(7) Degree of Crystallization of Crystalline Thermoplastic Resin Composition

Using a scanning differential calorimeter (DSC, produced by SII Nanotechnology Inc.), 10 mg of a crystalline thermoplastic resin composition was placed in a closed cell made of aluminum and heated from room temperature to 220° C. at a rate of 10° C./min and, after being kept at 220° C. for 10 minutes, cooled from 220° C. to room temperature at a rate of 10° C./min. The area of the crystallization exothermic curve during the temperature lowering process was defined as the heat of crystallization (J/g), and the ratio (%) thereof to the heat of melting of a crystalline thermoplastic resin having a degree of crystallization of 100% was calculated.

Raw materials used in Reference Examples, Examples, and Comparative Examples are as follows.

Metal oxide fine particles A: amorphous silica produced by Nippon Shokubai Co., Ltd., trade name "SEAHOSTER KE-W10 (an aqueous dispersion)", number average particle size 130 nm. Has hydroxyl groups on the surface.

Metal oxide fine particles B: colloidal silica produced by Nissan Chemical Ind., Ltd., trade name "Snowtex CL (an aqueous dispersion)", number average particle size 45 nm. Has hydroxyl groups on the surface.

Metal oxide fine particles C: organosilica sol produced by Nissan Chemical Ind., Ltd., trade name "Methanol Silica Sol (a dispersion in methanol)", number average particle size 15 nm. Has hydroxyl groups on the surface.

Metal oxide fine particles D: talc produced by Nippon Talc Co., Ltd., trade name "MICRO ACE P-6", number average particle size 1,200 nm. Has hydroxyl groups on the surface.

Amino-modified silane coupling agent: a reagent produced by Kanto Chemical Co., Inc., "γ-aminopropyltriethoxysilane (γ-APS)".

Organically modified metal oxide: colloidal silica produced by Nippon Aerosil Co., Ltd., trade name "AEROSIL R805", number average particle size 12 nm, amount of modification with an organic substance (octyl group) 5.5%.

Compound a having an ethylenically unsaturated group and an organic peroxide group within one molecule: t-butylperoxy-2-methacryloxyethyl monocarbonate produced by NOF Corporation, trade name "Peromer MEC (MEC)".

Compound b having an ethylenically unsaturated group and an organic peroxide group within one molecule: t-butylperoxy allyl monocarbonate produced by NOF Corporation, trade name "Peromer AC (AC)".

Thermoplastic resin (PS): polystyrene resin produced by PS Japan Corporation, trade name "HF 77", mass average molecular weight (Mw) 244,000, polydispersity index (Mw/Mn) 3.2.

Crystalline thermoplastic resin (PLLA): poly-L-lactic acid resin produced by Mitsui Chemicals, Inc., trade name "LACER H-100", mass average molecular weight (Mw) 150,000, polydispersity index (Mw/Mn) 2.2, equilibrium melting point 115° C., heat of melting 93 J/g at a degree of crystallization of 100%.

REFERENCE EXAMPLE 1

Production of Metal Oxide Fine Particles Aa Having Organic Peroxide Group on Surface By centrifuging aqueous dispersion of the metal oxide fine particles A, and repeating three times an operation of washing the precipitate with N-methylpyrrolidone and centrifuging, N-methylpyrrolidone dispersion of solid content of 20 mass % was obtained.

In a 200 ml beaker, there were introduced 25 g of the N-methylpyrrolidone dispersion (solid content, 20 mass %) of the metal oxide fine particles A and 100 ml of N-methylpyrrolidone, and the mixture was dispersed by a homomixer (produced by Tokushukika Kogyo Kabushiki Kaisha, T.K. HOMO MIXER MARK II-f) at 6,000 rpm for 10 minutes. The dispersion was introduced into a 300 ml four-necked flask and was dispersed by a crescent stirring blade at 400 rpm for 5 minutes. To this four-necked flask was added 2 g of an amino-modified silane coupling agent (γ-APS) and the mixture was allowed to react at 110° C. for 8 hours. The reaction product obtained was centrifuged and the precipitate was subjected three times to an operation of washing with methanol and centrifuging. Drying of the material under vacuum afforded metal oxide fine particles having amino groups on the surface. When the amount of the amino group introduced into this amino-modified metal oxide fine particles was analyzed by chemical titration, it was found to be 0.5 mass part relative to 100 mass parts of the metal oxide fine particles.

In a 200 ml beaker, there were introduced 4 g of the amino-modified metal oxide fine particles and 120 ml of cyclohexanone, and the mixture was dispersed by a homomixer (produced by Tokushukika Kogyo Kabushiki Kaisha, T.K. HOMO MIXER MARK II-f) at 6,000 rpm for 10 minutes. The dispersion was introduced into a 300 ml four-necked flask and was dispersed by a crescent stirring blade at 400 rpm for 5 minutes. To this four-necked flask was added 2.4 g (3 times the mole of amino groups) of a compound (MEC) containing an ethylenically unsaturated group and an organic peroxide group, and the mixture was allowed to react at 40° C. for 24 hours under nitrogen bubbling (20 ml/min). The reaction product obtained was centrifuged, and the precipitate was subjected three times to an operation of washing with methanol and centrifuging to obtain metal oxide fine particles Aa having organic peroxide group on the surface. The amount of the organic peroxide group introduced into this metal oxide fine particles having organic peroxide group on the surface was analyzed by chemical titration and the result is shown in Table 1. In addition, Table 1 shows the metal oxide fine particles set at 100 mass parts and, based on this, the amounts of γ-APS, the amino groups introduced, and the organic peroxide group introduced are shown in mass parts.

REFERENCE EXAMPLE 2

Production of Metal Oxide Fine Particles Ab Having Organic Peroxide Group on Surface Metal oxide fine particles Ab having organic peroxide group on the surface were obtained in the same manner as in Reference Example 1, except that 2.4 g (3 times the mole of amino groups) of MEC was changed to 0.4 g (0.5 time the mole of amino groups) of MEC. The amount of the organic peroxide group introduced into this metal oxide fine particles having organic peroxide group on the surface was analyzed by chemical titration and the result is shown in Table 1.

REFERENCE EXAMPLE 3

Production of Metal Oxide Fine Particles Ac Having Organic Peroxide Group on Surface Metal oxide fine particles Ac having organic peroxide group on the surface were obtained in the same manner as in Reference Example 1, except that 2.4 g (3 times the mole of amino groups) of MEC was changed to 8 g (10 times the mole of amino groups) of MEC. The amount of the organic peroxide group introduced into this metal oxide fine particles having organic peroxide on the surface was analyzed by chemical titration and the result is shown in Table 1.

REFERENCE EXAMPLE 4

Production of Metal Oxide Fine Particles B Having Organic Peroxide Group on Surface Metal oxide fine particles B having organic peroxide group on the surface were obtained in the same manner as in Reference Example 1, except that the metal oxide fine particles A were changed to the metal oxide fine particles B. The amount of the organic peroxide group introduced into this metal oxide fine particles having organic peroxide group on the surface was analyzed by chemical titration and the result is shown in Table 1.

REFERENCE EXAMPLE 5

Production of Metal Oxide Fine Particles C Having Organic Peroxide Group on Surface Metal oxide fine particles C having organic peroxide group on the surface were obtained in the same manner as in Reference Example 1, except that the metal oxide fine particles A were changed to the metal oxide fine particles C. The amount of the organic peroxide group introduced to this metal oxide fine particles having organic peroxide group on the surface was analyzed by chemical titration and the result is shown in Table 1.

REFERENCE EXAMPLE 6

Production of Metal Oxide Fine Particles D Having Organic Peroxide Group on Surface Metal oxide fine particles D having organic peroxide group on the surface were obtained in the same manner as in Reference Example 1, except that the metal oxide fine particles A were changed to the metal oxide fine particles D. The amount of the organic peroxide group introduced to this metal oxide fine particles having organic peroxide group on the surface was analyzed by chemical titration and the result is shown in Table 1.

REFERENCE EXAMPLE 7

Production of Metal Oxide Fine Particles Ad Having Organic Peroxide Group on the Surface Metal oxide fine particles Ad having organic peroxide group on the surface were obtained in the same manner as in Reference Example 1, except that 2.4 g (3 times the mole of amino groups) of MEC was changed to 1.7 g (3 times the mole of amino groups) of AC. The amount of the organic peroxide group introduced into this metal oxide fine particles having organic peroxide group on the surface was analyzed by chemical titration and the result is shown in Table 1.

COMPARATIVE REFERENCE EXAMPLE 1

Production of Metal Oxide Fine Particles Having Thermoplastic Resin Grafted on Surface In a 100 ml beaker, there were introduced 2 g of the metal oxide fine particles Aa obtained in Reference Example 2, having organic peroxide group on the surface, and 55 g of a styrene monomer, and the mixture was dispersed by a homomixer (produced by Tokushukika Kogyo Kabushiki Kaisha, T.K. HOMO MIXER MARK II-f) at 3,000 rpm for 10 minutes. The dispersion was introduced into a 100 ml four-necked flask and was dispersed by a crescent stirring blade for at 400 rpm 5 minutes under nitrogen bubbling (20 ml/min). This dispersion was dispersed at 100° C. for 2 hours under nitrogen bubbling (20 ml/min). The reaction product obtained was centrifuged and the precipitate was subjected three times to an operation of washing with tetrahydrofuran (THF) and centrifuging, followed by drying under vacuum to obtain metal oxide fine particles having polystyrene grafted on the surface. The amount of the grafted polystyrene in this metal oxide fine particles having polystyrene grafted to the surface was, when measured by a thermogravimetric instrument (produced by SII Nanotechnology Inc., TG 220), 10 mass parts relative to 100 mass parts of the metal oxide fine particles.

EXAMPLE 1

A thermoplastic resin composition was obtained by dry-blending 100 mass parts of a thermoplastic resin (PS) and the metal oxide fine particles Aa having organic peroxide group on the surface, obtained in Reference Example 1, and by melt-kneading the blend at 210 rpm for 5 minutes by a melt-kneading apparatus (Laboplast Mill μ, a small segment mixer: model KF6, disc: high-shear type, produced by ToyoSeiki Seisakusho, Co., Ltd.) which was set at 180° C. With the thermoplastic resin composition obtained, there was analyzed qualitatively and quantitatively the thermoplastic resin (PS) contained in the metal oxide fine particles having a thermoplastic resin (PS) grafted thereto and dispersibility of the metal oxide fine particles in the thermoplastic resin composition was measured. The results are shown in Table 2.

Also, by using a hot press machine set at 180° C., a test piece of 20 mm width, 40 mm length, and 1 mm thickness was formed from the thermoplastic resin composition obtained and, by using a dynamic viscoelasticity measuring instrument, the bending storage modulus ($E'_{30°C.}$) at 30° C. and the bending storage modulus ($E'_{TG}$) at the glass transition temperature ($T_g$) were measured. A relative ratio of each value to the $E'_{30°C.}$ (2.0 GPa) and $E'_{TG}$ (7.2 MPa), respectively, of the thermoplastic resin (PS) alone were calculated. They are shown in Table 2 as mechanical strength ($E'_{30°C.}$) and heat resistance ($E'_{TG}$).

EXAMPLE 2

A thermoplastic resin composition was obtained in the same manner as in Example 1, except that the metal oxide fine particles Aa having organic peroxide group on the surface, obtained in Reference Example 1, was changed to the metal oxide fine particles Ab having organic peroxide group on the surface, obtained in Reference Example 2. The thermoplastic resin composition obtained was evaluated in the same manner as in Example 1 and the results are shown in Table 2.

EXAMPLE 3

A thermoplastic resin composition was obtained in the same manner as in Example 1, except that the metal oxide fine particles Aa having organic peroxide group on the surface, obtained in Reference Example 1, was changed to the metal oxide fine particles Ac having organic peroxide group on the surface, obtained in Reference Example 3. The thermoplastic resin composition obtained was evaluated in the same manner as in Example 1 and the results are shown in Table 2.

EXAMPLE 4

A thermoplastic resin composition was obtained in the same manner as in Example 1, except that the metal oxide fine particles Aa having organic peroxide group on the surface, obtained in Reference Example 1, was changed to the metal oxide fine particles B having organic peroxide group on the surface, obtained in Reference Example 4. The thermoplastic resin composition obtained was evaluated in the same manner as in Example 1 and the results are shown in Table 2.

EXAMPLE 5

A thermoplastic resin composition was obtained in the same manner as in Example 1, except that the metal oxide fine particles Aa having organic peroxide group on the surface, obtained in Reference Example 1, was changed to the metal oxide fine particles C having organic peroxide group on the surface, obtained in Reference Example 5. The thermoplastic resin composition obtained was evaluated in the same manner as in Example 1 and the results are shown in Table 2.

EXAMPLE 6

A thermoplastic resin composition was obtained in the same manner as in Example 1, except that the metal oxide fine particles Aa having organic peroxide group on the surface, obtained in Reference Example 1, was changed to the metal oxide fine particles Ad having organic peroxide group on the surface, obtained in Reference Example 7. The thermoplastic resin composition obtained was evaluated in the same manner as in Example 1 and the results are shown in Table 2.

COMPARATIVE EXAMPLE 1

A thermoplastic resin composition was obtained in the same manner as in Example 1, except that the metal oxide fine particles Aa having organic peroxide group on the surface, obtained in Reference Example 1, was changed to the metal oxide fine particles A having no organic peroxide group. The thermoplastic resin composition obtained was evaluated in the same manner as in Example 1 and the results are shown in Table 2.

TABLE 1

| | | | Reference Examples | | | | | | |
|---|---|---|---|---|---|---|---|---|---|
| | | | 1 | 2 | 3 | 4 | 5 | 6 | 7 |
| Amino-modified metal oxide fine particles | Metal oxide fine particles | A (number average particle size 130 nm) | 100 | 100 | 100 | — | — | — | 100 |
| | | B (number average particle size 45 nm) | — | — | — | 100 | — | — | — |

TABLE 1-continued

|  |  | Reference Examples | | | | | | |
|---|---|---|---|---|---|---|---|---|
|  |  | 1 | 2 | 3 | 4 | 5 | 6 | 7 |
|  | C (number average particle size 15 nm) | — | — | — | — | 100 | — | — |
|  | D (number average particle size 6700 nm) | — | — | — | — | — | 100 | — |
|  | γ-APS | 40 | 40 | 40 | 40 | 40 | 40 | 40 |
|  | Amount of amino group introduced | 0.5 | 0.5 | 0.5 | 0.8 | 0.7 | 0.5 | 0.5 |
| Organic peroxide group-modified metal oxide fine particles | Charging molar ratio (peroxide/amino group) | 3 | 0.5 | 10 | 3 | 3 | 3 | 3 |
|  | Amount of organic peroxide introduced | 2.5 | 0.3 | 8.2 | 2.4 | 2.5 | 0.8 | 2.4 |

TABLE 2

|  |  |  | Examples | | | | | | Comp. Exp. |
|---|---|---|---|---|---|---|---|---|---|
|  |  |  | 1 | 2 | 3 | 4 | 5 | 6 | 1 |
| Constituents | Thermoplastic resin (PS) |  | 100 | 100 | 100 | 100 | 100 | 100 | 100 |
|  | Metal oxide fine particles having organic peroxide group | Content (mass part) | 10 | 10 | 10 | 10 | 10 | 10 | — |
|  |  | Reference Examples | 1 | 2 | 3 | 4 | 5 | 6 | — |
|  |  | number average particle size of the primary metal oxide fine particles (nm) | 130 | 130 | 130 | 45 | 15 | 130 | — |
|  |  | Content of organic peroxide group introduced (mass part) | 2.5 | 0.3 | 8.2 | 2.4 | 2.5 | 2.4 | — |
|  | Metal oxide fine particles having no organic peroxide group | Content (mass part) | — | — | — | — | — | — | 10 |
|  |  | Sample | — | — | — | — | — | — | Metal oxide fine particles A |
|  |  | number average particle size of the primary metal oxide fine particles (nm) | — | — | — | — | — | — | 130 |
|  |  | Content of organic peroxide group introduced (mass part) | — | — | — | — | — | — | 0 |
| Thermoplastic resin composition | Metal oxide fine particles having thermoplastic resin (PS) grafted thereto | Content of PS introduced measured by TG (mass part) | 6.7 | 2.2 | 11.9 | 7.5 | 9.1 | 6.1 | 0 |
|  |  | FT-IR intensity ratio | 0.2 | 0.1 | 0.4 | 0.2 | 0.3 | 0.2 | 0 |
|  | Dispersibility of metal oxide fine particles | Number of particles per 1 μm | 26 | 20 | 28 | 67 | 110 | 27 | 11 |
|  |  | Number average particle size of dispersion (nm) | 160 | 190 | 140 | 60 | 30 | 160 | 600 |
|  | Mechanical strength ($E'_{30°C}$) |  | 1.3 | 1.2 | 1.4 | 1.5 | 1.5 | 1.3 | 1.1 |
|  | Heat resistance ($E'_{TG}$) |  | 2.5 | 2.1 | 3.1 | 4.7 | 6 | 2.4 | 1.4 |

EXAMPLE 7

A thermoplastic resin composition was obtained in the same manner as in Example 1, except that 10 mass parts of the metal oxide fine particles Aa having organic peroxide group on the surface, obtained in Reference Example 1, were changed to 0.05 mass part thereof. The thermoplastic resin composition obtained was evaluated in the same manner as in Example 1 and the results are shown in Table 3.

EXAMPLE 8

A thermoplastic resin composition was obtained in the same manner as in Example 1, except that 10 mass parts of the metal oxide fine particles Aa having organic peroxide group on the surface, obtained in Reference Example 1, were changed to 40 mass parts thereof. The thermoplastic resin composition obtained was evaluated in the same manner as in Example 1 and the results are shown in Table 3.

COMPARATIVE EXAMPLE 2

A thermoplastic resin composition was obtained in the same manner as in Example 1, except that the metal oxide fine particles Aa having organic peroxide group on the surface, obtained in Reference Example 1, was changed to the metal oxide fine particles having polystyrene grafted on the surface, obtained in Comparative Reference Example 1. The thermoplastic resin composition obtained was evaluated in the same manner as in Example 1 and the results are shown in Table 3.

COMPARATIVE EXAMPLE 3

A thermoplastic resin composition was obtained in the same manner as in Example 1, except that the metal oxide fine particles Aa having organic peroxide group on the surface, obtained in Reference Example 1, was changed to commercially available, organically modified metal oxide fine particles (hereinafter, abbreviated as organically modified metal oxide fine particles) having no organic peroxide group on the surface. The thermoplastic resin composition obtained was evaluated in the same manner as in Example 1 and the results are shown in Table 3.

moduli (ET'$_{30° C.}$) at 30° C. of the thermoplastic resin compositions obtained was 1.2 to 5 times as large as E'$_{30° C.}$ of the thermoplastic resin alone and, further, the storage moduli (E'$_{TG}$) at the glass transition temperature became 2 to 10 times as large as E'$_{TG}$ of the thermoplastic resin alone. As a result, it became clear that the thermoplastic resin compositions of Examples 1 to 6 have excellent mechanical strength and heat resistance.

TABLE 3

|  |  |  | Examples | | Comparative Examples | |
|---|---|---|---|---|---|---|
|  |  |  | 7 | 8 | 2 | 3 |
| Constituents | Thermoplastic resin (PS) |  | 100 | 100 | 100 | 100 |
|  | Metal oxide fine particles having organic peroxide group | Content (mass part) | 0.05 | 40 | — | — |
|  |  | Reference Examples | 1 | 1 | — | — |
|  |  | number average particle size of the primary metal oxide fine particles (nm) | 130 | 130 | — | — |
|  |  | Content of organic peroxide group introduced (mass part) | 2.5 | 2.5 | — | — |
|  | Metal oxide fine particles having no organic peroxide group | Content (mass part) | — | — | 10 | 10 |
|  |  | Sample | — | — | Comparative Reference Example 1 | Organically modified metal oxide |
|  |  | number average particle size of the primary metal oxide fine particles (nm) | — | — | 130 | 12 |
|  |  | Content of organic peroxide group introduced (mass part) | — | — | 10 | 5.5 |
| Thermoplastic resin composition | Metal oxide fine particles having thermoplastic resin (PS) grafted thereto | Content of PS introduced measured by TG (mass part) | 2.7 | 10.1 | 10.4 | — |
|  |  | FT-IR intensity ratio | 0.1 | 0.4 | 0.4 | — |
|  | Dispersibility of metal oxide fine particles | Number of particles per 1 μm | 2 | 91 | 14 | 50 |
|  |  | Number average particle size of dispersion (nm) | 150 | 180 | 460 | 530 |
|  | Mechanical strength (E'$_{30° C.}$) |  | 1.3 | 1.2 | 1.1 | 1.1 |
|  | Heat resistance (E'$_{TG}$) |  | 2.5 | 2.1 | 1.5 | 1.6 |

As shown in Tables 2 and 3, though metal oxide fine particles having a thermoplastic resin grafted thereto were not produced in Comparative Example 1, where the metal oxide fine particles having no organic peroxide group on the surface were used, in Examples 1 to 8, where the metal oxide fine particles having organic peroxide group on the surface were used, it became clear that the metal oxide fine particles having a thermoplastic resin grafted thereto were produced and the metal oxide fine particles dispersed uniformly in the thermoplastic resin composition. Also, in Examples 1 to 8, it became clear that the thermoplastic resin compositions in Example 1 to 8 have excellent mechanical strength and heat resistance because the bending storage moduli (E'$_{30° C.}$) at 30° C. of the thermoplastic resin compositions are 1.2 to 5 times as large as E'$_{30° C.}$ of the thermoplastic resin alone and, further, the storage moduli (E'$_{TG}$) at the glass transition temperature are 2 to 10 times as large as E'$_{TG}$ of the thermoplastic resin alone.

Further, when Examples 1 to 6 are compared with Comparative Examples 2 and 3, production of graft materials is thought to occur during melt-kneading to a greater extent in Examples 1 to 6 than the thermoplastic resin compositions wherein the metal oxide fine particles to which polystyrene was grafted beforehand by a radical polymerization or the commercially available organically modified metal oxide fine particles were melt-kneaded. Therefore, in Examples 1 to 6, the metal oxide fine particles are dispersed even more uniformly in the thermoplastic resin and the bending storage moduli (ET'$_{30° C.}$) at 30° C. of the thermoplastic resin compositions obtained was 1.2 to 5 times as large as E'$_{30° C.}$ of the thermoplastic resin alone and, further, the storage moduli (E'$_{TG}$) at the glass transition temperature became 2 to 10 times as large as E'$_{TG}$ of the thermoplastic resin alone. As a result, it became clear that the thermoplastic resin compositions of Examples 1 to 6 have excellent mechanical strength and heat resistance.

When thermoplastic resins other than polystyrene (PS) are used, a similar effect of improvements in dispersion, mechanical properties, and heat resistance are obtained.

Hereinafter, examples of the second embodiment will be described. The scope of the present invention is not limited to the examples.

EXAMPLE 9

A crystalline thermoplastic resin composition was obtained in the same manner as in Example 1, except that 100 mass parts of a crystalline thermoplastic resin (PLLA) was used. The obtained crystalline thermoplastic resin composition was analyzed qualitatively and quantitatively for the crystalline thermoplastic resin contained in the metal oxide fine particles having a thermoplastic resin (PLLA) grafted thereto and dispersibility of the metal oxide fine particles in the crystalline thermoplastic resin composition was measured. The results are shown in Table 4.

Also, by using a scanning differential calorimeter (DSC, produced by SII Nanotechnology Inc.), 10 mg of the thermoplastic resin composition obtained was measured for the crystallization peak temperature and the heat of crystallization, from which the degree of supercooling and the degree of crystallization were calculated with the results shown in Table 4.

EXAMPLE 10

A crystalline thermoplastic resin composition was obtained in the same manner as in Example 9, except that the metal oxide fine particles Aa having organic peroxide group on the surface, obtained in Reference Example 1, was changed to the metal oxide fine particles Ab having organic peroxide group on the surface, obtained in Reference Example 2. The crystalline thermoplastic resin composition obtained was evaluated in the same manner as in Example 9 and the results are shown in Table 4.

EXAMPLE 11

A crystalline thermoplastic resin composition was obtained in the same manner as in Example 9, except that the metal oxide fine particles Aa having organic peroxide group on the surface, obtained in Reference Example 1, was changed to the metal oxide fine particles Ac having organic peroxide group on the surface obtained in Reference Example 3. The crystalline thermoplastic resin composition obtained was evaluated in the same manner as in Example 9 and the results are shown in Table 4.

EXAMPLE 12

A crystalline thermoplastic resin composition was obtained in the same manner as in Example 9, except that the metal oxide fine particles Aa having organic peroxide group on the surface, obtained in Reference Example 1, was changed to the metal oxide fine particles B having organic peroxide group on the surface, obtained in Reference Example 4. The crystalline thermoplastic resin composition obtained was evaluated in the same manner as in Example 9 and the results are shown in Table 4.

EXAMPLE 13

A crystalline thermoplastic resin composition was obtained in the same manner as in Example 9, except that the metal oxide fine particles Aa having organic peroxide group on the surface, obtained in Reference Example 1, was changed to the metal oxide fine particles C having organic peroxide group on the surface, obtained in Reference Example 5. The crystalline thermoplastic resin composition obtained was evaluated in the same manner as in Example 9 and the results are shown in Table 4.

EXAMPLE 14

A crystalline thermoplastic resin composition was obtained in the same manner as in Example 9, except that the metal oxide fine particles Aa having organic peroxide group on the surface, obtained in Reference Example 1, was changed to the metal oxide fine particles Ad having organic peroxide group on the surface, obtained in Reference Example 7. The crystalline thermoplastic resin composition obtained was evaluated in the same manner as in Example 9 and the results are shown in Table 4.

COMPARATIVE EXAMPLE 4

A thermoplastic resin composition was obtained in the same manner as in Example 9, except that 5 mass parts of the metal oxide fine particles Aa having organic peroxide group on the surface, obtained in Reference Example 1, was changed to 0 mass part. The thermoplastic resin composition obtained was evaluated in the same manner as in Example 9 and the results are shown in Table 4.

COMPARATIVE EXAMPLE 5

A thermoplastic resin composition was obtained in the same manner as in Example 9, except that the metal oxide fine particles Aa having organic peroxide group on the surface, obtained in Reference Example 1, was changed to the metal oxide fine particles A having no organic peroxide group. The thermoplastic resin composition obtained was evaluated in the same manner as in Example 9 and the results are shown in Table 4.

TABLE 4

|  |  |  | Examples |  |  |  |  |  | Comparative Examples |  |
|---|---|---|---|---|---|---|---|---|---|---|
|  |  |  | 9 | 10 | 11 | 12 | 13 | 14 | 4 | 5 |
| Constituents | Crystalline thermoplastic resin (PLLA) |  | 100 | 100 | 100 | 100 | 100 | 100 | 100 | 100 |
|  | Metal oxide fine particles having organic peroxide group | Content (mass part) | 5 | 5 | 5 | 5 | 5 | 5 | 0 | — |
|  |  | Reference Examples | 1 | 2 | 3 | 4 | 5 | 7 | 1 | — |
|  |  | number average particle size of the primary metal oxide fine particles (nm) | 130 | 130 | 130 | 45 | 15 | 130 | 130 | — |
|  |  | Content of organic peroxide group introduced (mass part) | 2.5 | 0.3 | 8.2 | 2.4 | 2.5 | 2.4 | 2.5 | — |
|  | Metal oxide fine particles having no organic peroxide group | Content (mass part) | — | — | — | — | — | — | — | 5 |
|  |  | Sample | — | — | — | — | — | — | — | Metal oxide fine particles A |
|  |  | number average particle size of the primary metal oxide fine particles (nm) | — | — | — | — | — | — | — | 130 |
|  |  | Content of organic peroxide group introduced (mass part) | — | — | — | — | — | — | — | 0 |
| Crystalline thermoplastic resin composition | Metal oxide fine particles having crystalline thermoplastic | Content of PLLA introduced measured by TG (mass part) | 4.5 | 1.8 | 6.8 | 5.5 | 6.2 | 4.4 | — | 0 |
|  |  | FT-IR intensity ratio | 0.2 | 0.1 | 0.3 | 0.2 | 0.3 | 0.2 | — | 0 |

TABLE 4-continued

|  |  | Examples | | | | | | Comparative Examples | |
|---|---|---|---|---|---|---|---|---|---|
|  |  | 9 | 10 | 11 | 12 | 13 | 14 | 4 | 5 |
| resin (PLLA) grafted thereto | | | | | | | | | |
| Dispersibility of metal oxide fine particles | Number of particles per 9 μm² | 140 | 110 | 150 | 300 | 540 | 140 | — | 50 |
|  | Number average particle size of dispersion (nm) | 150 | 180 | 130 | 50 | 30 | 150 | — | 600 |
| Degree of supercooling (° C.) | | 109 | 118 | 108 | 108 | 106 | 109 | — | 125 |
| Degree of crystallization (%) | | 60.1 | 50.3 | 62.1 | 61.3 | 63.1 | 59.8 | 0 | 18.9 |

EXAMPLE 15

A thermoplastic resin composition was obtained in the same manner as in Example 9, except that 5 mass parts of the metal oxide fine particles Aa having organic peroxide group on the surface, obtained in Reference Example 1, was changed to 0.5 mass part thereof. The thermoplastic resin composition obtained was evaluated in the same manner as in Example 9 and the results are shown in Table 5.

EXAMPLE 16

A thermoplastic resin composition was obtained in the same manner as in Example 9, except that 5 mass parts of the metal oxide fine particles Aa having organic peroxide group on the surface, obtained in Reference Example 1, was changed to 20 mass parts thereof. The thermoplastic resin composition obtained was evaluated in the same manner as in Example 9 and the results are shown in Table 5.

EXAMPLE 17

A crystalline thermoplastic resin composition was obtained in the same manner as in Example 9, except that the metal oxide fine particles Aa having organic peroxide group on the surface, obtained in Reference Example 1, was changed to the metal oxide fine particles D having organic peroxide group on the surface, obtained in Reference Example 6. The crystalline thermoplastic resin composition obtained was evaluated in the same manner as in Example 9 and the results are shown in Table 5.

COMPARATIVE EXAMPLE 6

A thermoplastic resin composition was obtained in the same manner as in Example 9, except that the metal oxide fine particles Aa having organic peroxide group on the surface, obtained in Reference Example 1, was changed to the organically modified metal oxide fine particles. The thermoplastic resin composition obtained was evaluated in the same manner as in Example 9 and the results are shown in Table 5.

COMPARATIVE EXAMPLE 7

A thermoplastic resin composition was obtained in the same manner as in Example 9, except that the metal oxide fine particles Aa having organic peroxide group on the surface, obtained in Reference Example 1, was changed to the metal oxide fine particles D having no organic peroxide group. The thermoplastic resin composition obtained was evaluated in the same manner as in Example 9 and the results are shown in Table 5.

TABLE 5

|  |  |  | Examples | | | Comparative Examples | |
|---|---|---|---|---|---|---|---|
|  |  |  | 15 | 16 | 17 | 6 | 7 |
| Constituents | Crystalline thermoplastic resin (PLLA) | | 100 | 100 | 100 | 100 | 100 |
|  | Metal oxide fine particles having organic peroxide group | Content (mass part) | 0.5 | 20 | 5 | — | — |
|  |  | Reference Examples | 1 | 1 | 6 | — | — |
|  |  | number average particle size of the primary metal oxide fine particles (nm) | 130 | 130 | 1200 | — | — |
|  |  | Content of organic peroxide group introduced (mass part) | 2.5 | 2.5 | 0.8 | — | — |
|  | Metal oxide fine particles having no organic peroxide group | Content (mass part) | — | — | — | 5 | 5 |
|  |  | Sample | — | — | — | Organically modified metal oxide | Metal oxide fine particles D |
|  |  | number average particle size of the primary metal oxide fine particles (nm) | — | — | — | 12 | 1200 |
|  |  | Content of organic peroxide group introduced (mass part) | — | — | — | 5.5 | 0 |
| Crystalline thermoplastic resin composition | Metal oxide fine particles having crystalline thermoplastic resin (PLLA) | Content of PLLA introduced measured by TG (mass part) | 2.2 | 8.1 | 3.1 | — | 0 |
|  |  | FT-IR intensity ratio | 0.1 | 0.3 | 0.2 | — | 0 |

TABLE 5-continued

|  |  | Examples | | | Comparative Examples | |
|---|---|---|---|---|---|---|
|  |  | 15 | 16 | 17 | 6 | 7 |
| grafted thereto | | | | | | |
| Dispersibility of metal oxide fine particles | Number of particles per 9 μm² | 20 | 910 | 2 | 500 | 0 |
| | Number average particle size of dispersion (nm) | 150 | 180 | 1400 | 530 | 8200 |
| Degree of supercooling (° C.) | | 119 | 107 | 107 | 127 | 121 |
| Degree of crystallization (%) | | 30.1 | 63.4 | 53.8 | 2.2 | 46.2 |

As shown in Tables 4 and 5, the crystallization peak temperature and the heat of crystallization are absent in Comparative Example 4 where, even though a crystalline thermoplastic resin not containing any metal oxide fine particles was used, crystallization did not occur under this condition. Also, in Comparative Examples 5 and 6, because the metal oxide fine particles having no organic peroxide group or the organically modified metal oxide fine particles were included in the crystalline thermoplastic resin, the rate of crystallization and the degree of crystallization improved compared to Comparative Example 4 but both were still insufficient.

In contrast, in Examples 9 to 17 where the metal oxide fine particles having organic peroxide group on the surface were used, it became clear that the metal oxide fine particles having a thermoplastic resin grafted thereto were produced and the metal oxide fine particles dispersed uniformly in the crystalline thermoplastic resin composition, in comparison to the Comparative Examples 5 to 7 where metal oxide fine particles having organic peroxide group on the surface were not used. Therefore, in the crystalline thermoplastic resin compositions of Examples 9 to 17, the degrees of supercooling were 106 to 119° C. and the degrees of crystallization were 30.1 to 63.4%. Thus, it can easily be anticipated that the molded articles obtained from the crystalline thermoplastic resin compositions have excellent mechanical strength and heat resistance.

When crystalline thermoplastic resins other than poly-L-lactic acid (PLLA) are used, a similar effect of improvements in dispersion, mechanical properties, and heat resistance are obtained.

The first and second embodiments can also be put into effect with the following modifications.

As the metal oxide fine particles in the first and second embodiments, there may be used silicon oxide fine particles of different number average diameters in combination or there may be used silicon oxide fine particles and other primary metal oxide fine particles in combination.

As the organic peroxide, a plurality of peroxy carbonates may be used, or the peroxy monocarbonate and other organic peroxides may be used in combination.

As the organic peroxide, a plurality of kinds having different decomposition initiation temperatures may be used in combination and the temperature of melt-kneading may be adjusted.

The thermoplastic resin composition may be constituted so as to include a plurality of graft materials, the plural number of graft materials being prepared by changing the kinds and the like of the thermoplastic resins and the metal oxide fine particles.

As the crystalline thermoplastic resin of the second embodiment, there may be used at least one kind of crystalline thermoplastic resin wherein at least either of the degree of supercooling in the range of 0 to 120° C. and the degree of crystallization in the range of 20 to 100% has a value different from those in each of the above-described Examples.

In the crystalline thermoplastic resin composition according to the second embodiment, the content of the graft material may be adjusted to a desired value by further adding the crystalline thermoplastic resin to a composition comprising a graft material and the crystalline thermoplastic resin, the graft material comprising the metal oxide fine particles having organic peroxide group on the surface and the crystalline thermoplastic resin melt-kneaded.

The invention claimed is:

1. A thermoplastic resin composition, comprising:
   a graft material; and
   a thermoplastic resin base material for dispersing the graft material therein, wherein the graft material comprises metal oxide fine particles having an organic peroxide group on the surface thereof and a thermoplastic resin which is melt-kneaded, the thermoplastic resin being grafted to the metal oxide fine particles,
   wherein the organic peroxide group is a peroxy monocarbonate group ($-OC(O)OOR^3$ wherein $R^3$ is $C_nH_{2n+1}$ or $C_6H_4-C_{m-1}H_{2m-1}$; n and m are integers from 1 to 20).

2. The thermoplastic resin composition according to claim 1, wherein the metal oxide fine particles are formed by using silicon oxide fine particles having hydroxyl groups on the surface thereof.

3. The thermoplastic resin composition according to claim 2, wherein the metal oxide fine particles are organic peroxide group-modified metal oxide fine particles obtained by introducing amino groups on the surface of the silicon oxide fine particles by reacting an amino-modified silane coupling agent with the hydroxyl groups of the silicon oxide fine particles and reacting the amino groups and a compound having an ethylenically unsaturated group and an organic peroxide group.

4. The thermoplastic resin composition according to claim 3, wherein the compound having an ethylenically unsaturated group and an organic peroxide group is t-butylperoxy-2-methacryloyloxyethyl monocarbonate or t-butylperoxy allyl monocarbonate.

5. The thermoplastic resin composition according to claim 1, wherein, as a physical property of a molded article obtained by molding the thermoplastic resin composition, the bending storage modulus at 30° C. prescribed in JIS K 7244-3 is 1.2 to 5 times as large as the bending storage modulus of the thermoplastic resin alone, and the bending storage modulus at the glass transition temperature is 2 to 10 times as large as the bending storage modulus at the glass transition temperature of the thermoplastic resin alone.

6. The thermoplastic resin composition according to claim 1, wherein the content of the graft material is 0.01 to 50 mass parts relative to 100 mass parts of the thermoplastic resin composition.

7. The thermoplastic resin composition according to claim 1, wherein the thermoplastic resin is at least one selected from polystyrene resins, poly(meth)acrylic resins, polycarbonate resins, polyester resins, polyolefin resins, polyamide resins, polyacetal resins, polysulfide resins, polyether resins, or mixtures thereof.

8. The thermoplastic resin composition according to claim 1, wherein the thermoplastic resin base material is the same material as the thermoplastic resin.

9. The thermoplastic resin composition according to claim 1, wherein the thermoplastic resin is a crystalline thermoplastic resin and the thermoplastic resin base material is a crystalline thermoplastic resin base material.

10. The thermoplastic resin composition according to claim 9, wherein the degree of supercooling obtained from crystallization peak temperature as prescribed in JIS K 7121 is 0 to 120° C. and the degree of crystallization obtained from heat of crystallization as prescribed in JIS K 7122 is 20 to 100%.

11. The thermoplastic resin composition according to claim 9, wherein when the thermoplastic resin composition is cooled at a cooling rate of 2° C/min in a measurement of the heat of crystallization as prescribed in JIS K 7122, exothermic heat of crystallization is observed.

12. The thermoplastic resin composition according to claim 9, comprising 0.5 to 20 mass parts of the graft material relative to 100 mass parts of the crystalline thermoplastic resin composition.

13. A molded article obtained by molding the thermoplastic resin composition according to claim 1.

14. A process for producing a thermoplastic resin composition according to claim 1, the process comprising melt-kneading the thermoplastic resin and the metal oxide fine particles having an organic peroxide group on the surface thereof to graft a portion of the thermoplastic resin to the metal oxide fine particles thereby forming a graft material and to disperse the graft material in the thermoplastic resin base material, wherein the organic peroxide group is a peroxy monocarbonate group ($-OC(O)OOR^3$ wherein $R^3$ is $C_nH_{2n+1}$ or $C_6H_4-C_{m-1}H_{2m-1}$; n and m are integers from 1 to 20).

* * * * *

UNITED STATES PATENT AND TRADEMARK OFFICE
CERTIFICATE OF CORRECTION

PATENT NO. : 8,575,268 B2  Page 1 of 1
APPLICATION NO. : 12/674672
DATED : November 5, 2013
INVENTOR(S) : Takamura et al.

It is certified that error appears in the above-identified patent and that said Letters Patent is hereby corrected as shown below:

In the Specifications

Column 6, Line 16: delete "rim" and inert -- nm --.

Column 16, Line 25: delete "CL" and insert -- OL --.

Column 16, Line 56: delete "LACER" and insert -- LACEA --.

Column 29, Line 20: delete "particles having" and insert -- particles D having --.

Signed and Sealed this
Twenty-ninth Day of April, 2014

Michelle K. Lee
*Deputy Director of the United States Patent and Trademark Office*